United States Patent
Yano et al.

(10) Patent No.: US 10,417,773 B2
(45) Date of Patent: Sep. 17, 2019

(54) METHOD AND APPARATUS FOR DETECTING OBJECT IN MOVING IMAGE AND STORAGE MEDIUM STORING PROGRAM THEREOF

(71) Applicant: CANON KABUSHIKI KAISHA, Tokyo (JP)

(72) Inventors: Kotaro Yano, Tokyo (JP); Ichiro Umeda, Tokyo (JP); Muling Guo, Kawasaki (JP); Lifeng Xu, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 382 days.

(21) Appl. No.: 15/058,067

(22) Filed: Mar. 1, 2016

(65) Prior Publication Data

US 2016/0260226 A1 Sep. 8, 2016

(30) Foreign Application Priority Data

Mar. 2, 2015 (JP) .................................. 2015-040748

(51) Int. Cl.
*G06T 7/20* (2017.01)
*G06K 9/00* (2006.01)
(Continued)

(52) U.S. Cl.
CPC .......... *G06T 7/248* (2017.01); *G06K 9/00362* (2013.01); *G06K 9/00771* (2013.01);
(Continued)

(58) Field of Classification Search
USPC ........................................................ 382/103
See application file for complete search history.

(56) References Cited

U.S. PATENT DOCUMENTS 9,298,984 B2 * 3/2016 Tsukamoto ........ G06K 9/00577
9,589,595 B2 * 3/2017 Gao .................... G06K 9/00664
(Continued)

FOREIGN PATENT DOCUMENTS

| CN | 102422325 A | 4/2012 |
| CN | 102457680 A | 5/2012 |

(Continued)

OTHER PUBLICATIONS

Wael Abd-Almageed et al., "Real-Time Human Detection and Tracking from Mobile Vehicles," Intelligent Transportation Systems Conference, Seattle, WA, USA, Sep. 30-Oct. 3, 2007, pp. 149-154.

(Continued)

*Primary Examiner* — Ishrat I Sherali
(74) *Attorney, Agent, or Firm* — Canon U.S.A., Inc. IP Division

(57) ABSTRACT

An image processing apparatus includes an obtaining unit configured to obtain a moving image, a detection unit configured to detect a detection target object from an interest image frame in the moving image, a tracking unit configured to obtain a tracked object in a neighborhood region of a detection position of the detection target object in an image frame preceding the interest image frame in the moving image, and a determination unit configured to determine whether or not the tracked object corresponds to the detection target object by integrating a position where the detection target object is detected by the detection unit and a position where the tracked object is obtained by the tracking unit.

14 Claims, 6 Drawing Sheets

(51) Int. Cl.
*G06T 7/246* (2017.01)
*G06T 7/277* (2017.01)
*G06K 9/32* (2006.01)

(52) U.S. Cl.
CPC ...... *G06T 7/277* (2017.01); *G06K 2009/3291* (2013.01); *G06T 2207/10016* (2013.01); *G06T 2207/20076* (2013.01); *G06T 2207/30196* (2013.01)

(56) References Cited

U.S. PATENT DOCUMENTS

| | | | |
|---|---|---|---|
| 9,811,732 B2 * | 11/2017 | Sundaresan | G06K 9/00624 |
| 9,852,511 B2 * | 12/2017 | Gao | G06T 7/20 |
| 2008/0187175 A1 | 8/2008 | Kim | |
| 2013/0136303 A1 * | 5/2013 | Tsukamoto | G06K 9/00577 382/103 |
| 2014/0205141 A1 * | 7/2014 | Gao | G06T 7/20 382/103 |
| 2015/0179219 A1 * | 6/2015 | Gao | G06K 9/00664 386/278 |
| 2016/0063357 A1 * | 3/2016 | Gao | G06K 9/4604 382/159 |

FOREIGN PATENT DOCUMENTS

| | | |
|---|---|---|
| CN | 103106667 A | 5/2013 |
| JP | 2013065103 A | 4/2013 |
| JP | 2013114605 A | 6/2013 |
| JP | 2014-48702 A | 3/2017 |

OTHER PUBLICATIONS

Tong Zhang, "Video Security with Human Identification and Tracking," 2013 IEEE International Conference on Multimedia and Expo (ICME), IEEE, Jul. 14, 2014 (Jul. 14, 2014), pp. 1-6.

Ivo M. Creusen et al., "ViCoMo: Visual Context Modeling for Scene Understanding in Video Surveillance," Journal of Electronic Imaging dtd. Oct.-Dec. 2013, vol. 22(4), pp. 041117-1 thru 041117-19.

Navneet Dalal, Histograms of Oriented Gradients for Human Detection, pp. 1-8, INRIA Rhone-Alps, 655 avenue de l'Europe, Montbonnot 38334, France (Navneet.Dalal,Bill.Triggsg@inrialpes.fr, http://lear.inrialpes.fr).

* cited by examiner

FIG. 4A     FIG. 4B     FIG. 4C
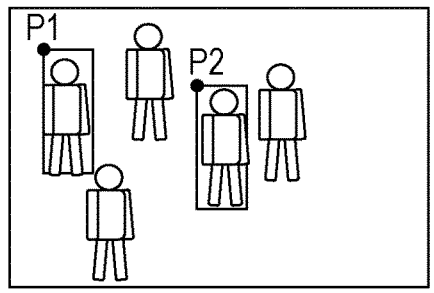 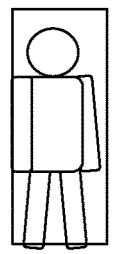 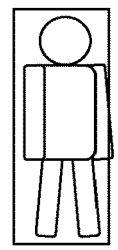
FIG. 5
| IDENTIFICATION NUMBER | POSITIONAL COORDINATES | IMAGE DATA |
|---|---|---|
| 1 | (x1, y1) | {p11, p12, ..., p1N} |
| 2 | (x2, y2) | {p21, p22, ..., p2N} |
FIG. 6
| IDENTIFICATION NUMBER | POSITIONAL COORDINATES | FRAME NUMBER |
|---|---|---|
| 1 | (x1, y1) | f1 |
| 2 | (x2, y2) | f2 |

| IDENTIFICATION NUMBER | OBJECT IDENTIFICATION NUMBER | STATE |
|---|---|---|
| 1 | {ID1} | detect |
| 2 | {ID2} | detect |

| IDENTIFICATION NUMBER | OBJECT IDENTIFICATION NUMBER | STATE |
|---|---|---|
| 1 | {ID11, ID12} | track |
| 2 | {ID21, ID22} | track |

METHOD AND APPARATUS FOR DETECTING OBJECT IN MOVING IMAGE AND STORAGE MEDIUM STORING PROGRAM THEREOF

BACKGROUND OF THE INVENTION

Field of the Invention

The present invention relates to an image processing method and apparatus for detecting a predetermined object in a moving image.

Description of the Related Art

In recent years, a system has been proposed in which video shot by a monitoring camera is analyzed to detect whether or not a person intrudes into a monitoring area, and a detection result is reported. In addition to the detection of the intrusion, a system has also been proposed in which people that have passed through the monitoring area during a predetermined period are counted by tracking people displayed on a screen, or a degree of congestion is detected from the number of people counted.

To realize the above-described application, a person needs to be automatically detected from the monitoring camera video to be tracked. A method of detecting the person from the image includes, for example, a method proposed by Dalal and Triggs. Histograms of Oriented Gradients for Human Detection. IEEE Computer Society Conference on Computer Vision and Pattern Recognition. According to the proposed method, a histogram in a gradient direction of a pixel value is extracted from the image, and it is determined by using the histogram as a feature amount (HOG feature amount) whether or not a partial region in the image is a person. That is, a human outline is represented by the feature amount corresponding to the gradient direction of the pixel value to be used for the recognition.

However, to apply the above-described human detection technology to an actual monitoring camera video, a detection rate needs to be improved. In general, according to an object detection technology represented by the human detection technology, if the detection rate is intended to be increased, more misdetections occur (an object that is not a detection target is detected as an erroneous report), which is not ideal for practical use. Therefore, a method of improving the detection rate while the misdetections are suppressed is demanded.

As a solution to the above-described problems, a method of tracking a once-detected person in subsequent time-series images and continuously detecting a person in parallel to improve an apparent detection rate is conceivable. This method will be described with reference to FIG. 2. In FIG. 2, a rectangle indicated by a solid line on the image represents a human detection result, and a rectangle indicated by a broken line represents a tracking result. As illustrated in FIG. 2, a result detected at a time t is tracked in images at a time t+1 and a time t+2. Similarly, a result detected at the time t+1 is tracked in the subsequent image at the time t+2, and furthermore, a person is detected at the time t+2. In this example, a detector detects only two people among five people from each image, but all people are eventually detected and tracked by integrating the detection results with the tracking results.

In the above-described parallel use of the detection and tracking processing, according to Japanese Patent Laid-Open No. 2014-48702, a window where an object is detected in a previous frame is set as a tracking target, and also an object is searched for in part of regions obtained by dividing a current frame, so that the window where the object is newly detected by the search is added to the tracking target.

The tracking target is processed by using an object discriminator. When the discriminator is used for the tracking processing, the once-detected target can be reliably tracked without losing sight of the target.

However, even when the human tracking is performed by using the method disclosed in Japanese Patent Laid-Open No. 2014-48702, the detection rate is demanded to be further increased. For example, it is also conceivable that a threshold of the discriminator in the human detector is changed to improve the detection rate. In this case, a problem occurs that the number of misdetections is increased, and the erroneously detected target is kept tracked.

SUMMARY OF THE INVENTION

The present invention provides a high-accuracy image processing apparatus that detects an object from video and tracks the object.

According to an aspect of the present invention, there is provided an image processing apparatus including: an obtaining unit configured to obtain a moving image; a detection unit configured to detect a detection target object from an interest image frame in the moving image; a tracking unit configured to obtain a tracked object in a neighborhood region of a detection position of the detection target object in an image frame preceding the interest image frame in the moving image; and a determination unit configured to determine whether or not the tracked object corresponds to the detection target object by integrating a position where the detection target object is detected by the detection unit and a position where the tracked object is obtained by the tracking unit.

Further features of the present invention will become apparent from the following description of exemplary embodiments with reference to the attached drawings.

BRIEF DESCRIPTION OF THE DRAWINGS

FIGS. 4A, 4B and 4C illustrate example detection results.

FIG. 5 illustrates an example storage format in a detection result storage unit.

FIG. 6 illustrates an example storage format in an object information storage unit.

DESCRIPTION OF THE EMBODIMENTS

Hereinafter, exemplary embodiments of the present invention will be described with reference to the accompanying drawings.

First Exemplary Embodiment

Figure 1:
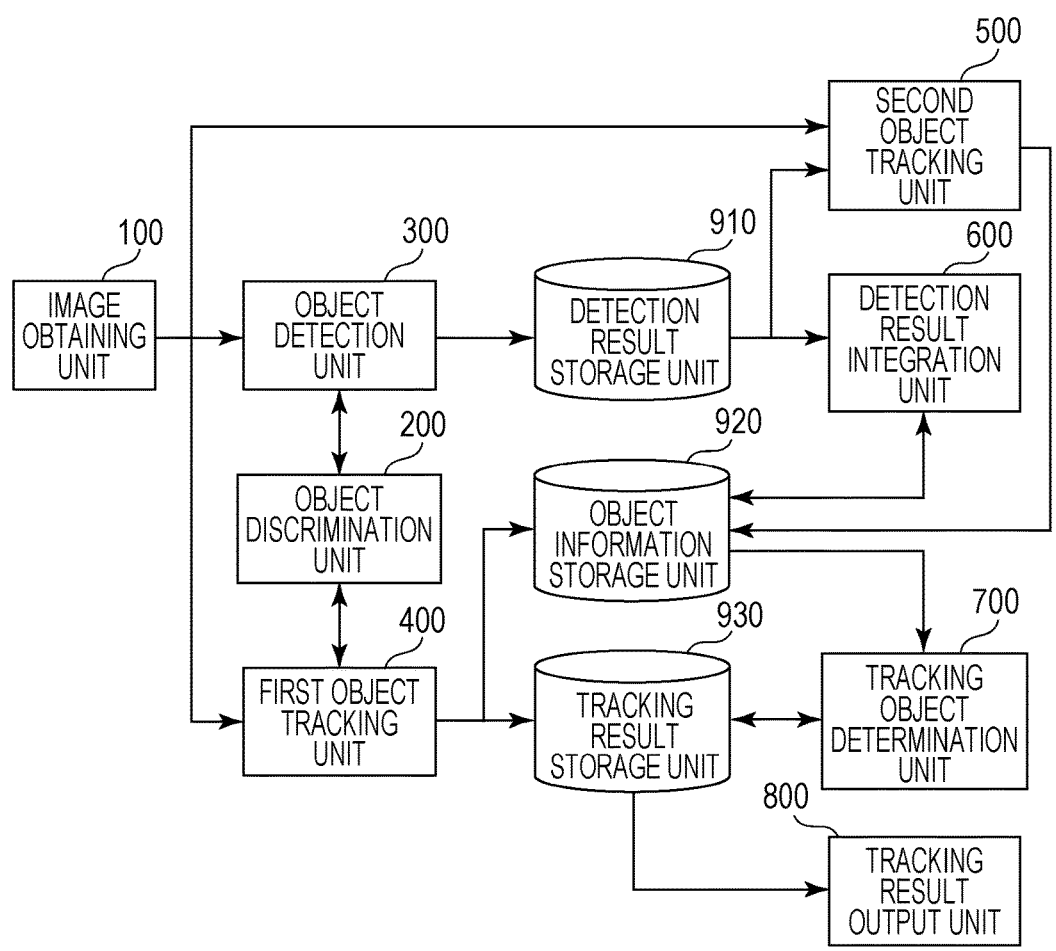
FIG. 1 illustrates a configuration of an image recognition apparatus according to a first exemplary embodiment.
Figure 2:
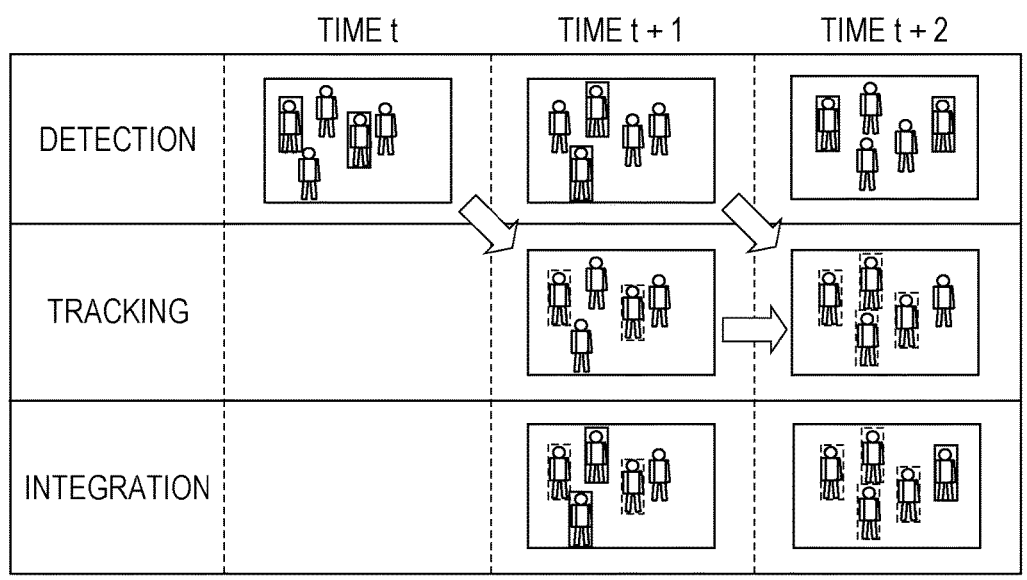
FIG. 2 is an explanatory diagram for describing coordination processing of detection and tracking.

FIG. 1 illustrates a configuration of an image recognition apparatus according to a first exemplary embodiment. As illustrated in FIG. 1, the image recognition apparatus according to the present exemplary embodiment includes an image obtaining unit 100, an object discrimination unit 200, an object detection unit 300, a first object tracking unit 400, a second object tracking unit 500, a detection result integration unit 600, a tracking object determination unit 700, a tracking result output unit 800, a detection result storage unit 910, an object information storage unit 920, and a tracking result storage unit 930.

The image obtaining unit 100 obtains image frame data from a moving image picked up by an image pickup unit such as a video camera. The image frame data obtained herein is an RGB image. The object discrimination unit 200 calculates and outputs a likelihood that a partial region of the image frame data (hereinafter, will also be simply referred as an image) obtained by the image obtaining unit 100 includes an object that is set as a detection target. According to the present exemplary embodiment, a person is set as the detection target. That is, the likelihood output by the object discrimination unit 200 is a value representing how much the partial region image is likely to be a person.

The object detection unit 300 scans the partial region from the image obtained by the image obtaining unit 100 and detects an object position in the image on the basis of the likelihood output by the object discrimination unit 200 with respect to the image data of the sequentially set partial regions, that is, the partial region images. The object detection unit 300 outputs a detection position where the object is detected and the corresponding partial region image. According to the present exemplary embodiment, the object detection unit 300 detects a position of the person in the image.

The first object tracking unit 400 scans the partial region from part of regions in the image obtained by the image obtaining unit 100 and tracks the object detected by the object detection unit 300 on the basis of the likelihood output by the object discrimination unit 200 with respect to the sequentially set partial region images. The part of regions scanned by the first object tracking unit 400 herein is a neighborhood region of the position where the object detection unit 300 detects the object in the image obtained by the image obtaining unit 100 at a previous time. According to the present exemplary embodiment, the first object tracking unit 400 tracks the position of the person in the image.

The second object tracking unit 500 scans the partial region from part of regions in the image obtained by the image obtaining unit 100 and tracks the object by using the partial region image detected by the object detection unit 300 with respect to the sequentially set partial region images. The part of regions scanned by the second object tracking unit 500 herein is a neighborhood region of the object position detected by the object detection unit 300. The object position tracked by the second object tracking unit 500 to be output is equivalent to the position at the end of the detection of the object detected by the object detection unit 300. In general, since the object detection takes time, the object detection is not performed for all the regions for each frame but is performed for one frame out of several frames by spending time of the several frames. For this reason, the frame at the end of the detection is different from the frame at the start of the detection, and the tracking is performed by the second object tracking unit 500.

The detection result integration unit 600 associates the object detected by the object detection unit 300 with the object tracked by the first object tracking unit 400 on the basis of the positional information. The tracking object determination unit 700 determines whether or not the currently tracked object is the object set as the detection and tracking target on the basis of the likelihood of the object tracked by the first object tracking unit 400 which is output by the object discrimination unit 200. According to the present exemplary embodiment, the tracking object determination unit 700 determines whether or not the currently tracked object is the person.

The tracking result output unit 800 outputs the tracking result. For example, the rectangle representing the partial region image determined as the person is superposed on the image data obtained by the image obtaining unit 100 to be displayed on a display. The detection result storage unit 910 stores the partial region image corresponding to the object position detected by the object detection unit 300 as the detection result.

The object information storage unit 920 stores the object position tracked by the first object tracking unit 400 and the second object tracking unit 500 as the object information while being associated with the image pickup time of the image data.

The tracking result storage unit 930 stores the result of the tracking by the first object tracking unit 400 and the second object tracking unit 500. The tracking result is associated with the object information at different times for each tracking object, and from this result, it is possible to reproduce a movement locus of the object.

Figure 3:
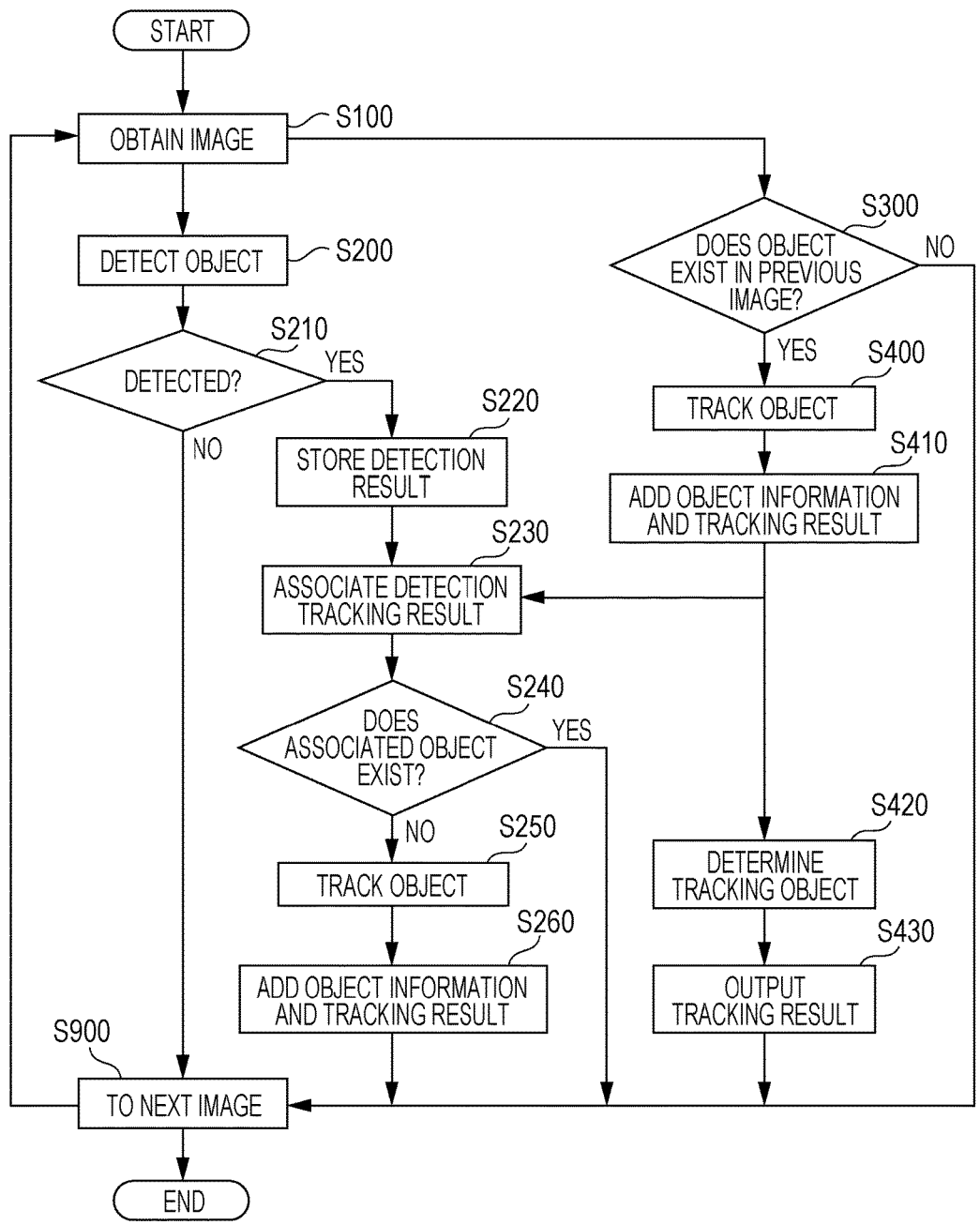
FIG. 3 is a processing flow chart according to the first exemplary embodiment.

Hereinafter, an operation according to the present exemplary embodiment will be described in accordance with a processing flow chart illustrated in FIG. 3. The image obtaining unit 100 obtains picked-up image data. Each of the obtained image data is stored in a memory of the image obtaining unit 100 (step S100). The object detection unit 300 scans a partial region from the image obtained in step S100 and detects an object position in the image (step S200). With respect to a partial region image cut out from the image, the object detection unit 300 obtains a likelihood that the partial region image includes an object set as a detection target by using the object discrimination unit 200. Then, the object detection unit 300 determines that the partial region having the likelihood higher than a predetermined threshold is the detection target object and output a position thereof. As a detection method performed by the object detection unit 300, for example, the above-described method described, in the paper by Dalal and others can be employed. According to this method, the partial region having a predetermined size and shape is scanned from the image while the position is gradually shifted in the image, and an HOG feature amount is obtained with respect to the cut-out partial region image to detect the person by a support vector machine (SVM).

Herein, an output of the SVM is equivalent to the likelihood. To detect people having different sizes from the image, reduction processing is previously performed on the image to have a predetermined magnification (for example, a magnification of 0.8 or a magnification of 0.82 corresponding to its square root), and detection processing is also performed on each of the reduced images. Hereinafter, for simplification, a case where the detection is performed for only one size will be described as an example. Therefore, the detection result output herein is the position in the horizontal and vertical directions in the image and corresponds, for example, to coordinates at the upper left edge of the partial region on the image.

In step S210, it is determined whether or not the target object (according to the present exemplary embodiment, the person) is detected from the image. In a case where the target object is not detected, the processing is shifted to step S900. In step S900, to process an image at a next time (a predetermined time such as, for example, 0.03 seconds later), the processing is shifted to step S100. It should be noted that "a case where the target object is not detected" in step S210 includes both a case where the detection processing in step S200 is not ended in a predetermined time and a case where the object detection processing is performed but the object is not detected eventually. On the other hand, in step S210, in a case where the target object is detected, the processing is shifted to step S220.

The detection result storage unit 910 stores the object position detected by the object detection unit 300 and the partial region image corresponding to its object position as the detection result (step S220). For example, as illustrated in FIG. 4A, two people are detected from the image. In this case, the positional coordinates of a point P1 and a point P2 in the horizontal and vertical directions in FIG. 4A are stored. At the same time, pieces of image data of the partial region images as illustrated in FIGS. 4B and 4C are stored. These results are respectively associated with identification numbers. FIG. 5 illustrates an example storage format in the detection result storage unit 910. (x1, y1) and (x2, y2) respectively represent the positional coordinates in the horizontal and vertical directions of the point P1 and the point P2, and {p11, p12, . . . , p1N} and {p21, p22, . . . , p2N} respectively represent pixel values of the partial region images. It should be noted however that N is the number of pixels of the partial region image. Similarly, in a case where L people are detected from one image, these results are stored with respect to identification numbers 1 to L.

The detection result integration unit 600 associates the detection result detected by the object detection unit 300 with the tracking result tracked by the first object tracking unit 400 on the basis of its positional information (step S230). The positional coordinates with respect to each of the detection results stored in step S220 are compared with the positional coordinates with respect to the result of the tracking by the first object tracking unit 400 to determine whether the positional coordinates are matched with each other. It should be noted however that the positional coordinates may be regarded to be matched with each other also in a case a difference between the coordinate values is within a predetermined range. The result of the tracking by the first object tracking unit 400 is stored in the object information storage unit 920. Details of the tracking processing in the first object tracking unit 400 and the tracking result will be described below.

In step S240, in a case where the object corresponding to all the detection results detected by the object detection unit 300 already exists in the object information storage unit 920, the processing is shifted to step S900. In step S900, to process an image at a next time, the processing is shifted to step S100. On the other hand, in step S240, in a case where the object corresponding to the detection results detected by the object detection unit 300 does not exist in the object information storage unit 920, that is, a case where the detection result includes a new object, the processing is shifted to step S250.

The second object tracking unit 500 scans the partial region from part of regions in the image obtained in step S100 and tracks the object by using the partial region image detected by the object detection unit 300 in step S200 with respect to the sequentially set partial region images (step S250). Herein, the target tracked by the second object tracking unit 500 is the object determined as the new object in step S240, and the neighborhood region of the object position stored in the detection result storage unit 910 is scanned. The range of the neighborhood region to be scanned is previously set in accordance with a scene to be shot so as to cover a range where the object is moved since the image is obtained until the object detection processing is ended. Since a processing time of the object detection unit 300 depends on an image to be processed, the range of the neighborhood region to be scanned may also be appropriately set in accordance with the processing time.

The second object tracking unit 500 correlates the partial region image of the image obtained in step S100 and the partial region image stored in the detection result storage unit 910 with each other and outputs the object position having a highest degree of similarity between the images as the tracking result. The degree of similarity between the images may be obtained from a correlation of the image data or an absolute value sum of the differences or may be obtained by extracting the image feature amounts from the respective images and obtaining a degree of similarity of the image feature amounts. The HOG feature amount or a color histogram can be used as the image feature amount, for example. The object position output herein is equivalent to the position at the end of the object detection detected by the object detection unit 300, and the second object tracking unit 500 estimates the position from the degree of similarity between the images.

The result tracked by the second object tracking unit 500 is added to the object information storage unit 920 and the tracking result storage unit 930 (step S260). The object position tracked by the second object tracking unit 500 is stored in the object information storage unit 920 as the object information while being associated with the image pickup time of the image data. The stored image pickup time may be an actual image pickup time or a frame number corresponding to the image pickup time. These results are respectively associated with the identification numbers. FIG. 6 illustrates an example storage format in the object information storage unit 920. (x1, y1) and (x2, y2) respectively represent the positional coordinates of the tracked object, and f1 and f2 respectively represent frame numbers of the tracked images. In a case where these two objects are tracked from one image, f1 and f2 are the same number.

Figures 7, 8, 9:
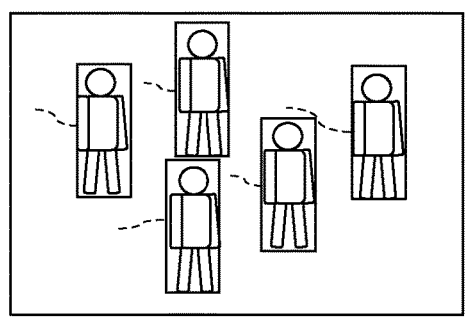
FIG. 7 illustrates an example storage format in a tracking result storage unit in an initial state.
FIG. 8 illustrates an example storage format in the tracking result storage unit during object tracking.
FIG. 9 illustrates an example image output of the tracking result.

The identification number of the object information stored in the object information storage unit 920 of the object tracked by the second object tracking unit 500 is stored in the tracking result storage unit 930 so as to be associated among different times for each tracking target. These results are respectively associated with the identification numbers of the tracking results. In step S260, since the tracking result of the newly detected object is stored for the first time, one identification number of the object information exists. In addition, identifiers representing states are assigned to the respective tracking results. FIG. 7 illustrates an example storage format in the tracking result storage unit 930.

The example of FIG. 7 relates to the results obtained by detecting two objects by the object detection unit 300 and tracking the respective objects by the second object tracking unit 500 as newly detected objects. ID1 and ID2 respectively represent the identification numbers of the object information stored in the object information storage unit 920 corresponding to the identification numbers of the tracking results. 'Detect' represents a state in which an "object is newly detected". According to the present exemplary embodiment, three states including 'detect', 'track', and 'recognize' are used as identifiers representing states of the tracking results. 'Track' and 'recognize' respectively represent "tracking in progress" and "recognized as a target object". Details of state updates will be described below.

In step S900, to obtain an image at a next time, the processing is shifted to step S100. According to the present exemplary embodiment, processing of tracking the detected object from the image obtained in step S100 is performed in parallel with the processing in steps S200 to S260. In step S300, a reference is made to the object information stored in the object information storage unit 920 to search whether or not the object set as the tracking target exists in the image at a previous time. For example, in a case where the image at a time t is obtained, it is checked if the object information having the frame number equivalent to a time t−1 exists. In a case where the object set as the tracking target does not exist, the processing is shifted to step S900. In step S900, to obtain an image at a next time, the processing is shifted to step S100. On the other hand, in a case where the object set as the tracking target exists, the relevant identification number of the object information is obtained, and the processing is shifted to step S400.

The first object tracking unit 400 scans the partial region from part of regions in the image obtained in step S100 and tracks the object on the basis of the likelihood output by the object discrimination unit 200 with respect to the sequentially set partial region images (step S400). The object tracked by the first object tracking unit 400 herein is the object stored in the object information storage unit 920, and the neighborhood region of the object position stored in the object information storage unit 920 is scanned. The range of the neighborhood region to be scanned is previously set in accordance with a scene to be shot so as to cover a range where the object is moved during the image obtaining period of the previous and next frames. Therefore, the first object tracking unit 400 scans the narrower range than the range scanned by the second object tracking unit 500. The first object tracking unit 400 obtains the likelihood that the partial region image includes the object set as the detection target with respect to the partial region image of the image obtained in step S100 by using the object discrimination unit 200. Then, the object position having the highest likelihood in the scanned neighborhood region is output as the tracking result. The processing in step S400 is repeatedly performed by the number of the object information obtained in step S300.

The result of the tracking by the first object tracking unit 400 is added to the object information storage unit 920 and the tracking result storage unit 930 (step S410). The object position tracked by the first object tracking unit 400 is stored in the object information storage unit 920 as the object information while being associated with the image pickup time of the image data. The object information is stored in the format as illustrated in FIG. 6. The identification numbers of the object information stored in the object information storage unit 920 of the object tracked by the first object tracking unit 400 are stored in the tracking result storage unit 930 while being associated between different times for each tracking object. These results are respectively associated with the identification numbers of the tracking results.

The identification number of the object information obtained in step S300 is searched for from the tracking result storage unit 930, and the object identification number tracked by the first object tracking unit 400 is added to the detection result holding the matched identification number. In addition, the state of the tracking result is updated to 'track'. FIG. 8 illustrates an example tracking result stored in the tracking result storage unit 930 at this time. {ID11, ID12} and {ID21, ID22} respectively represent the identification numbers of the object information stored in the object information storage unit 920 corresponding to the identification numbers of the tracking results. 'Track' represents a state of "tracking in progress". In this example, the objects having the identification numbers ID11 and ID21 where the tracking is started by the second object tracking unit 500 at the previous time are associated with the objects having the identification numbers ID12 and ID22 tracked by the first object tracking unit 400. For example, in a case where the object is tracked during N frames, the N identification numbers of the object information are stored alongside in the detection results. The processing in step S410 is repeatedly performed by the number of the object information obtained in step S300.

The tracking object determination unit 700 determines whether or not the currently tracked object is the object set as the detection and tracking target on the basis of the likelihood of the object tracked by the first object tracking unit 400 which is output by the object discrimination unit 200 (step S420). It is determined whether or not the likelihood of each of the tracking results obtained in step S400 output by the object discrimination unit 200 is higher than a predetermined threshold, and in a case where the likelihood is higher than a predetermined value, the currently tracked object is confirmed as the target object. At this time, the state of the tracking result is updated to 'recognize'. According to the present exemplary embodiment, a relatively low value is set as the threshold used in the object detection unit 300 in step S200 to improve the detection rate. That is, the object detected by the object detection unit 300 is in a state of being unconfirmed as the object set as the tracking object and is a candidate to be confirmed as the tracking object by the tracking object determination unit 700. On the other hand, a value higher than the value in step S200 is set as a threshold used in the tracking object determination unit 700 in step S420 to suppress the misdetection.

It should be noted that, according to the present exemplary embodiment, the object is confirmed as the target object in a case where the likelihood of the currently tracked object is higher than the predetermined value, but the object may be confirmed as the target object by obtaining a statistics amount from a plurality of likelihoods of the currently tracked objects at different times. For example, a frequency that the likelihood takes a value larger than a predetermined value or a relative frequency (a ratio of the frequency that the likelihood takes the value larger than the predetermined value to a total frequency as the statistics targets) is set as the statistics amount. When the determination is performed by obtaining the statistics amount from the plurality of likelihoods as described above, the accuracy of the determination result is increased, and it is possible to obtain the still more reliable result. To perform the determination processing by obtaining the statistics amount, the likelihood obtained in the object detection processing in step S200 and the likelihood obtained in the object tracking processing in step S400 are respectively stored in the detection result storage unit 910 and the object information storage unit 920 together with the object position. The processing in step S420 is repeatedly performed by the number of the object information obtained in step S300.

The tracking result output unit 800 outputs the tracking result confirmed as the target object in step S420 (step S430). FIG. 9 illustrates an example image output. In FIG. 9, the partial region confirmed as the target object (according to the present exemplary embodiment, the person) is represented by a rectangle, and the locus where the object is tracked is indicated by a broken line. The result in the 'recognize' state is extracted from among the tracking results stored in the tracking result storage unit 930, and the positional coordinates of the object information stored in the object information storage unit 920 are obtained from the object information identification number to draw the rectangle and the locus. The locus is obtained by connecting the center positions of the partial region with one another over the past times. In step S900, to obtain an image at a next time, the processing is shifted to step S100.

As described above, according to the first exemplary embodiment, while the once-detected person is tracked in the subsequent time-series images, the human detection is continued in parallel. Then, the first object tracking unit 400 tracks the person by using the object discrimination unit 200 and determines whether or not the tracking target is the person on the basis of the likelihood output by the object discrimination unit 200 in the tracking object determination unit 700 for each obtained image. As a result, since it is possible to determine whether or not the tracking target is the person at a higher frequency than that of the detection processing and also on the basis of a strict threshold, the detection rate can be improved while the misdetection is suppressed.

Furthermore, while the value lower than the threshold used in the tracking object determination unit 700 is set as the threshold used in the object detection unit 300, further more tracking target candidates are prepared, and the detection rate can be improved. In addition, according to the above-described exemplary embodiment, the second object tracking unit 500 tracks the object newly detected by the object detection unit 300, and the position at the end of the detection processing is estimated. As a result, even in a case where the detection processing takes time and the object is largely moved, it is possible to accurately track the object.

Second Exemplary Embodiment

Figure 10:
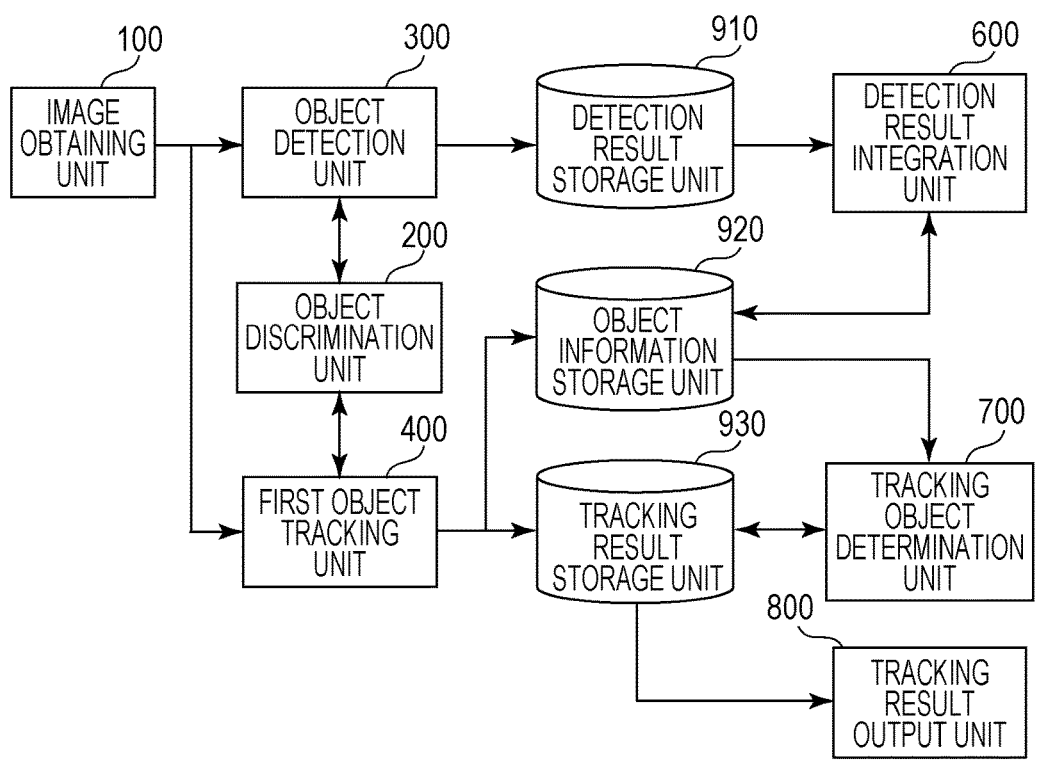
FIG. 10 illustrates a configuration of the image recognition apparatus according to a second exemplary embodiment.

In a case where the detection processing can be executed at a high speed or the movement speed of the object set as the detection target is relatively slow, since the position after the movement of the detected object during the detection does not need to be estimated, it is possible to adopt a still simpler configuration by omitting the second object tracking unit 500. FIG. 10 illustrates the configuration. In FIG. 10, components having the same reference symbols as those of FIG. 1 have equivalent functions. The operation is in conformity to the processing flow illustrated in FIG. 3, but the object tracking processing by the second object tracking unit 500 in step S250 is not included.

According to the above-described exemplary embodiment, the descriptions have been given while it is assumed that the partial region is scanned from the entire image to perform the detection processing, but the scanning region may be part of regions in the image. It is possible to limit the region to a region where a person may appear from the image such as, for example, a region equivalent to an end of the image or a doorway for a person in the shooting scene.

In addition, according to the above-described exemplary embodiment, the descriptions have been given while it is assumed that a person having a predetermined size who appears in the image is detected, but a person having a different size may be detected. In this case, not only the positional coordinates but also the size may also be stored in the detection result or the object information.

Furthermore, to improve the detection accuracy of the person, it is possible to adopt a configuration in which the object discrimination unit 200 is provided with a plurality of human models. For example, four human models including a front model, a back model, a left side model, and a right side model are separately provided, and the respective likelihoods are obtained. Then, the object detection unit 300 performs the detection processing from the result having the highest likelihood. It is possible to efficiently track the object in the first object tracking unit 400 by selecting the model of the object discrimination unit 200 in accordance with the model corresponding to the object detected by the object detection unit 300. For example, in a case where the object detection unit 300 detects the person in the front model, the object tracking processing is performed by limiting the human models to the three human models including the front model, the left side model, and the right side model.

The example in which the exemplary embodiment of the present invention is applied to the case where the person is detected from the image has been described above, but the exemplary embodiment of the present invention can be widely applied also to a case where an object other than the person is set as the detection target.

According to the above-described exemplary embodiment, it is determined whether or not the currently tracked object is the object set as the detection target on the basis of the likelihood output from the object discrimination unit. Therefore, even if the detector performs the misdetection, since it is determined whether or not the object is the person while the target is being tracked, it is possible to accurately detect and track the person.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-040748, filed Mar. 2, 2015, which is hereby incorporated by reference herein in its entirety.

What is claimed is:

1. An image processing apparatus comprising:
one or more processors; and
one or more memories coupled to the one or more processors, the memories having stored thereon instructions which, when executed by the one or more processors, cause the apparatus to:
obtain a moving image;
detect a region of a target object from an interest image frame in the moving image by evaluating a likelihood that the region includes the target object with a first criteria;
obtain a region of a tracked object corresponding to a previously detected region of the target object from the interest image frame in a neighborhood region of the previously detected region of the target object which was detected in an image frame preceding the interest image frame in the moving image;
confirm that the region of the tracked object includes the target object by evaluating a likelihood that the region of the tracked object includes the target object with a second criteria which has a higher threshold than the first criteria; and
a display control unit configured to display the confirmed region of the tracked object as a region of the target object in an image frame in the moving image on a display.

2. The image processing apparatus according to claim 1, wherein the one or more processors, cause the apparatus to confirm that the region of the tracked object includes the target object in a case where the likelihood is higher than a first threshold.

3. The image processing apparatus according to claim 1, wherein the one or more processors, further cause the apparatus to obtain a statistics amount from a plurality of likelihoods at different times with respect to the tracked object and confirms that the region of the tracked object includes the target object on the basis of the statistics amount.

4. The image processing apparatus according to claim 3, wherein the statistics amount is a frequency or a relative frequency that the plurality of likelihoods take a value higher than a first threshold.

5. The image processing apparatus according to claim 2, wherein the one or more processors, cause the apparatus to detect the region of the target object in a case where the likelihood is higher than a second threshold.

6. The image processing apparatus according to claim 5, wherein the second threshold is lower than the first threshold.

7. The image processing apparatus according to claim 1, wherein the one or more processors, further cause the apparatus to set a plurality of partial regions in the interest image frame and evaluates the likelihood for each partial region.

8. The image processing apparatus according to claim 1, wherein the one or more processors further causes the apparatus to:
estimate a latest region of the target object corresponding to the detected region of the target object.

9. The image processing apparatus according to claim 8, wherein the latest region of the target object is obtained by scanning part of regions in the image frame in the moving image, and a range of the scanning to obtain the latest region of the target object is broader than a scanning range to obtain the region of the tracked object.

10. The image processing apparatus according to claim 1, wherein the detection is performed with respect to part of image frames in the moving image.

11. The image processing apparatus according to claim 10, wherein the detection is performed with respect to every predetermined image frame in the moving image.

12. An image processing method comprising:
obtaining a moving image;
detecting a region of a target object from an interest image frame in the moving image by evaluating a likelihood that the region includes the target object with a first criteria;
obtaining a region of a tracked object corresponding to a previously detected region of the target object from the interest image frame in a neighborhood region of the previously detected region of the target object which was detected in an image frame preceding the interest image frame in the moving image;
confirming that the region of the tracked object includes the target object by evaluating a likelihood that the region of the tracked object includes the target object with a second criteria which has a higher threshold than the first criteria; and
displaying the confirmed region of the tracked object as a region of the target object in an image frame in the moving image on a display.

13. The image processing method according to claim 12, further comprising:
outputting a result based upon the determining of whether or not the tracked object corresponds to the detection target object.

14. A non-transitory computer readable storage medium storing a computer program that causes a computer to execute an image processing method comprising:
obtaining a moving image;
detecting a region of a target object from an interest image frame in the moving image by evaluating a likelihood that the region includes the target object with a first criteria;
obtaining a region of a tracked object corresponding to a previously detected region of the target object from the interest image frame in a neighborhood region of the previously detected region of the target object which was detected in an image frame preceding the interest image frame in the moving image;
confirming that the region of the tracked object includes the target object by evaluating a likelihood that the region of the tracked object includes the target object with a second criteria which has a higher threshold than the first criteria; and
displaying the confirmed region of the tracked object as a region of the target object in an image frame in the moving image on a display.

* * * * *